May 3, 1966  D. E. ROOP  3,249,002
BOWLING SCORE PROJECTOR
Filed June 18, 1963  2 Sheets-Sheet 1
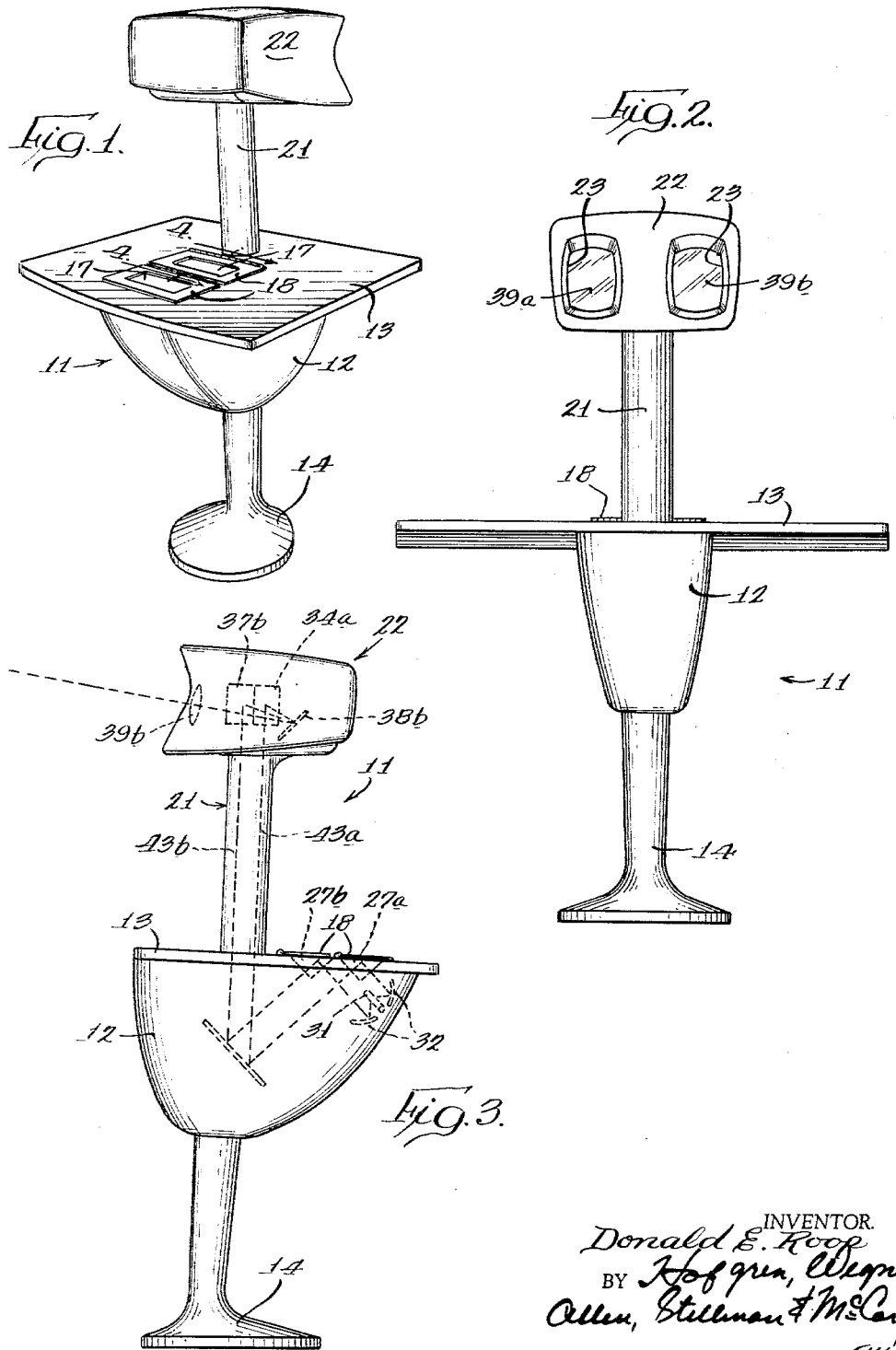
INVENTOR.
Donald E. Roop
BY Hofgren, Wegner,
Allen, Stillman & McCord
Att'ys May 3, 1966 D. E. ROOP 3,249,002
BOWLING SCORE PROJECTOR
Filed June 18, 1963 2 Sheets-Sheet 2
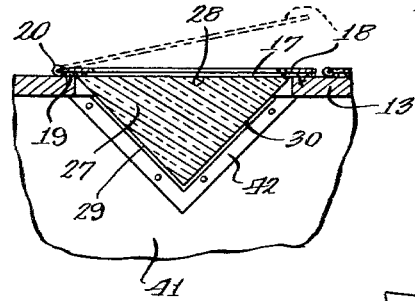
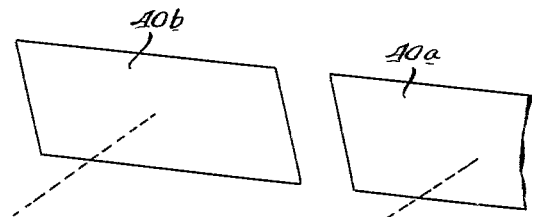
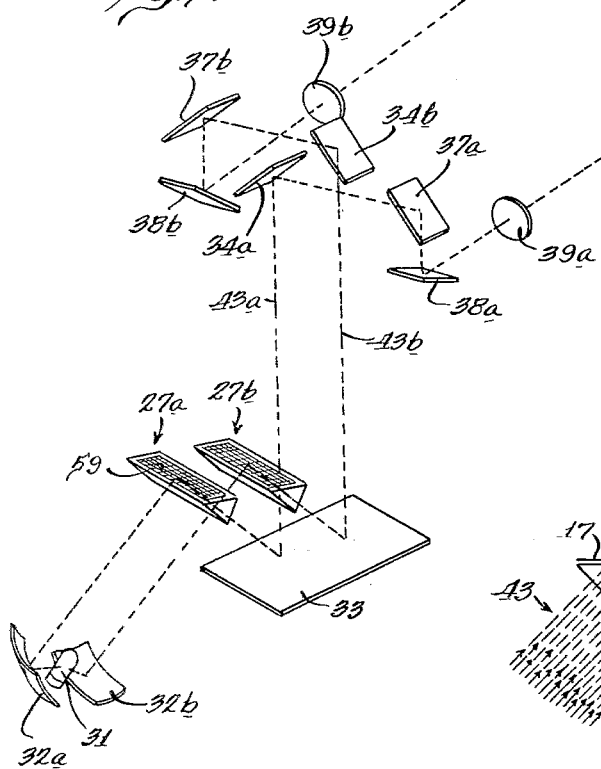
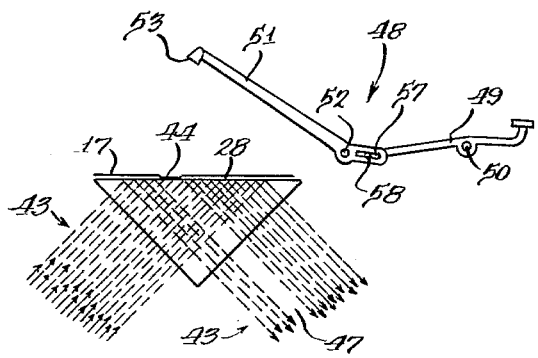

3,249,002
BOWLING SCORE PROJECTOR
Donald E. Roop, Columbus, Ohio, assignor, by mesne assignments, to Brunswick Corporation, Chicago, Ill., a corporation of Delaware
Filed June 18, 1963, Ser. No. 288,719
17 Claims. (Cl. 88—24)

This invention relates to projection or viewing apparatus and more particularly relates to a projecting or viewing device for projecting or viewing bowling scores.

With the advent and refinement of automatic pinsetting equipment, much attention is now being directed to devices directed to the production of printed bowling score information and the projecting of such information to a viewing screen to which reference may be made by bowlers and spectators during a bowling game for obtaining a given bowler's status with respect to score at any time during the game.

One approach to the provision of projecting devices for use in bowling games has been the adaptation of existing projectors for bowling purposes. However, because of the desirability of a variety of features in such a projector for use in producing a viewable projection of bowling scores, modifications of existing devices may often of necessity be extensive. Another approach, of course, is development of a new projection apparatus directed to the solution of particular problems involved in scoring bowling games and including features which are particularly desirable for use in projecting bowling scores during a bowling game.

Probably the most usual approach to the problem of providing a suitable projection apparatus has been to provide equipment utilizing transmitted light for projection purposes. One of the principal problems in the use of many transmitted light projectors is the lack of provision for continuously projecting an image onto a viewing screen while altering or adding to the image in a manner concealed from the viewer. During a bowling game, it is important to obtain projection of the image of the bowling score as soon as possible after the score is available, e.g., immediately after or at the time the score is recorded on a score sheet and preferably concurrently with the recording of the score on the score sheet. Preferably the image on the viewing screen should not be discontinued while printing a score on the score sheet. Nor should the image on the screen be interrupted by the appearance on the screen of an image of the printing mechanism or the score recorder's hand or a shadow thereof which may obscure or detract from the image of the score on the screen.

An additional important problem with respect to many projection systems arises from the fact that light, and especially stray light, is often directed into the eyes of the score keeper in manual score keeping operations where a score keeper records a score on a score sheet within a projector for immediate projection of score changes. Additionally, such projectors, which often use transparent score sheets, do not permit the direct production of multiple copies of the score sheet during the scoring process. Further, the score sheet may tend to become heated sufficiently to either detrimentally affect the material of the score sheet or the score sheet may become heated sufficiently to make manual contact therewith uncomfortable during manual recording of scores; such heating may result from the positioning of the score sheet directly in a transmitted light beam from a light source of sufficient intensity to accomplish the projection of images to a screen at a remote location.

It is a general object of this invention to provide a new and useful projection or viewing means.

A more particular object of this invention is to provide a new and useful projection or viewing means adapted to overcome many of the problems associated with projectors as discussed above and particularly usable in the printing and projection of bowling scores.

Another object is to provide a new and useful printing and projection device which is capable of continuously projecting an image onto a viewing screen while altering or adding to the image in a manner concealed from the viewer.

Still another object of this invention is to provide a score projector which includes a light-transmitting platen having a light-reflecting platen surface for backing a score sheet held adjacent the platen surface so that the surface of the score sheet remote from the platen surface is accessible for impressing a score legend thereon, whereupon light directed from a light source via an optical system associated with the platen is reflected from the platen surface to transmit an image of the score lengend to a viewing screen, the image of the score legend appearing on the platen surface as a pressure-adhering portion of the score sheet surface facing the platen surface, the portion of score sheet surface adhering to the light-reflecting surface being of the same form as the score legend impressed upon the remote surface of the sheet.

A further object of this invention is to provide for using a prism in a projection apparatus in accordance with any of the foregoing objects. Yet another object is to provide a new and useful prism member and association thereof especially in a viewing or projecting apparatus.

An additional object is to provide a new and useful projecting method in which a projecting apparatus of any of the foregoing objects may be employed.

Other objects of this invention will be apparent to those in the art from the following description and the drawings in which:

FIG. 1 is a perspective view of a form of projecting device for association with a viewing screen and showing the position of a printable sheet;

FIG. 2 is a view from the projecting end of the device of FIG. 1, i.e., from between the device and a viewing screen;

FIG. 3 is a side view of the device of FIG. 1, showing components of the optics system and the optics flow scheme in dotted lines;

FIG. 4 is a partial section through the device of FIG. 1 showing prism mounting and a hold down for the printable sheet;

FIG. 5 is a perspective view of an optics system, including a general light flow diagram, usable in the device of FIGS. 1–4; and FIG. 6 is a section through a prism with a sheet thereon illustrating light flow through the prism after printing upon the sheet and showing positioning of suitable printing means with respect to the prism surface.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the scope to the embodiment illustrated.

It is contemplated that the projection or viewing apparatus of the present invention can be utilized in connection with one or more bowling lanes, e.g., by placement at the bowler's end of a bowling lane or plurality of adjacent bowling lanes, and that such bowling lane or bowling lanes may be equipped with automatic pinsetting and ball returning equipment of conventional design such as are presently in use.

Referring now to the drawings, and especially first to FIGS. 1–3, there is provided a projector indicated generally by the reference numeral 11, having a casing 12 including a top casing member 13. Casing 12 is supported on a pedestal 14 which is in turn supported by flooring (not shown), e.g., at the bowlers' end of two adjacent bowling lanes.

The illustrated projector 11 includes a plurality of image surfaces, illustrated as a pair of such surfaces, each shown covered wtih a score sheet 17 held in place by a hinged cover 18. Referring also to FIG. 4, each of the covers 18 is secured to an underframe or register plate 19 by means of a hinge 20. Register plate 19 is secured to top 13 by screws or other suitable means and each of hinged covers 18 is positionable between a paper-holding position as shown in full lines in FIG. 4, and an open position as shown in dotted lines in FIG. 4. When in closed or paper-holding position, each cover 18 secures a sheet of paper against an image surface and when in open position, the sheet of paper may be withdrawn from the image surface and a new sheet may be inserted.

Each hinged cover is in the form of a peripheral frame having a central opening therethrough for writing or printing on the upper surface of the score sheet 17 disposed therebelow and held in place against the image surface thereby. The underframe 19 serves as a peripheral register for the sheet of paper and has a central opening slightly larger than that of the hinged cover 18 so that when a sheet of paper the approximate size of the central opening in the register member 19 is inserted and the hinged cover pivoted to its down or holding position, the hinged cover overlaps the central opening in member 19 sufficient to hold the peripheral portions of the score sheet 17 against unintentional movement or removal.

Mounted on and upstanding from casing 12, e.g., from top 13, is a hollow structural tube 21 supporting an overhead optics housing 22, having a pair of projection ports 23, best seen in FIG. 2.

Referring now especially to FIGS. 3–5, either or both covers 18 may be raised and a score sheet inserted. The score sheet is then marked. The material of the score sheet is such as to transfer, e.g., by carbon transfer, an image of the marking on the top surface thereof through the paper and onto an image surface of the projection system, which image surface is, in the illustrated form, an upwardly disposed surface of a prism 27, e.g., 27a or 27b. The projection system, provided with a suitable light source, transmits the image on the surface of the prism 27 through a suitable optical system and to a screen 40, e.g., 40a or 40b.

Each of prisms 27a and 27b has an internally reflecting surface, 28a and 28b, respectively, of generally rectangular configuration and two other rectangular surfaces indicated by reference numerals 29 and 30 with appropriate letter suffixes. The outer surface of the internally reflecting face 28 is disposed upwardly and is accessible through the openings in cover members 18. Surfaces 29a and 29b, respectively, are the surfaces through which light is directed in the projection system and surfaces 30a and 30b are the surfaces through which light reflected from surfaces 28a and 28b leaves the prisms.

In the projection system, a light source is provided in the form of a light bulb 31 which is energized from a suitable electric power source by suitable electric circuitry (not shown) in the normal manner for energization of projector light sources. Disposed adjacent and slightly behind the light source 31 are curved or parabolic mirrors 32a and 32b for directing light through faces 29a and 29b for reflection from surfaces 28a and 28b, respectively.

The light leaving prisms 27a and 27b through faces 30a and 30b is thereupon directed through projection lenses for projection on a viewing screen. Accordingly, the light from each prism is directed upon mirror 33 which reflects the light from prisms 27a and 27b through tube 21, respectively, to separate laterally and downwardly angled or inclined mirrors 34a and 34b which are in turn disposed or adjusted to reflect the light to laterally and downwardly inclined mirrors 37a and 37b. Thence the reflected light is reflected from mirrors 38a and 38b, respectively, the mirrors 38 having their reflecting surfaces inclined upwardly and rearwardly with respect to the projection unit.

The light is reflected by mirrors 38a and 38b through projection lenses 39a and 39b which focus the reflected images on screens 40a and 40b, respectively. The reflection and direction of the light from prisms 27a and 27b as described above is shown by the dotted lines 43a and 43b in FIG. 5.

Each of prisms 27 is mounted by a suitable bracket 41 including prism supporting flanges 42 for supporting each prism from below adjacent each of its triangular ends. Bracket 41 depends from top 13 and is secured to and supported from casing 12 by suitable mounting means (not shown). Frame member 19 overlaps on face 28 of each prism and serves to secure the prism against unintentional dislodgment from flanges 42, e.g., during transportation or the like.

The housing or casing 22 supported by column 21 contains the mirrors 34, 37, 38 and the projection lenses 39 and the mirrors and projection lenses within housing 22 are supported by suitable brackets (not shown) in their proper disposition for reflecting the image as described above.

Referring now especially to FIG. 6, with reference also to FIGS. 1–5, in accordance with the projection method of this invention, a score sheet 17 is placed on surface 28 of prism 27 and covered with hinged cover 18 as described above. Printing means such as a pencil may be used to mark scores upon a printable surface of score sheet 17 within proper grids provided on the score sheet in the usual manner. The bowling scores are printed as they are calculated from the fall of pins subsequent to bowling of each ball. Score sheet 17 includes a backing composition capable of transferring pressure printing from the upper surface of the sheet to the surface of the prism. The image thereby impressed upon surface 28 is projected to the viewing screen as described above.

In FIG. 6, the reference numeral 44 indicates a portion of sheet 17 on which a mark has been made. The light entering prism face 29, e.g., from source 31, is indicated by reference numeral 43. The light reflects internally from prism surface 28. The pressure printing has caused transfer of the printed image through score sheet 17 by means of a transferring backing such as carbon backing on sheet 17 to produce carbon or other impressions or copies of the indicia or score information printed on the score sheet upon the image surface 28. The impressions thusly created on image surface 28 provide the sole image source needed for projection.

The image in the projection system, therefore, originates on the platen surface 28 and, with bulb 31 illuminated, a light beam from paralobic mirrors 32 is directed through the prism and reflected from surface 28. The light 43 is directed into prism 27 through surface 29 at an angle sufficiently acuate with respect to surface 28. The angle is preferably at or below the maximum angle for total reflectivity, i.e., the critical angle of incidence which is about 37 to 42 degrees for a glass and air interface as at surface 28.

The light 43 as it leaves surface 30 of prism 27 includes reflected light only from those portions of surface 28 which do not have an image 44 present thereon. An omission in the reflected light 43 is shown by reference numeral 47, representative of nonreflection of light from portion 44. When light 43 is directed to and focused upon a screen 40, the omission 47 shows up as a legible image on the screen.

The image surface 28 of prism 27 serves as a platen surface and the prism itself serves as a light transmitting platen, with platen surface 28 being an internally light-reflecting surface for backing the score sheet. A mark 44 created by pressure on the upper surface of the score sheet produces a corresponding nonreflective area adhering to surface 28 so that as the light beam from the light source is reflected from surface 28, the nonreflective portion 44 provides an area of omission in the reflected light, an image corresponding to area 44 being transmitted to viewing screen 40.

As shown in FIG. 5, the surface 28 of prism 27 may be provided with permanently printed material in the form of a bowling score sheet grid as shown by reference numeral 59, since such a grid is common to all score projections to be made. Grid 59 may be, for example, black lacquer lines painted on the exterior surface 25 or black lettered metal or plastic grids may be embedded in surface 28; other means for providing permanent or semi-permanent grids on surface 28 will be apparent.

Because the image on the surface 28 of prism 27 is reflected away from the printable surface of score sheet 17, rather than transmitted therethrough, the upper surface of score sheet 17 remains relatively cool to the touch and the printing means, e.g., pencil or stylus, used in printing the scores on the score sheet is not seen in the projected image.

Score sheet 17 may be composed of paper of the type including its own ink supply, e.g., in encapsulated form. For example, score sheet 17 may be NCR paper backed with carbon so that when struck by stylus 53, the ink supply within sheet 17 causes formation of a legible image responsive to the pressure of stylus 53, and a carbon backing provided on sheet 17 also transfers an image to the surface 28 of prism 27.

Although the above description was with reference to marking on the surface of score sheet 17 with a pencil, other means such as a type stylus of the kind normally used in a typewriter may be used. A suitable type stylus and linkage is shown generally at reference numeral 48 and includes a key and arm 49 pivotally mounted at 50 to suitable framework (not shown) and a type arm 51 also pivotally mounted at 52 to suitable framework (not shown). Type arm 51 includes a stylus or printing surface 53 which is configurated to impress indicia of desired form on paper 17. Arm 51 includes a slot 57 and arm 49 has a pin 58 mounted thereto and projecting through slot 57 so that when key 49 is depressed, stylus 53 will strike score sheet 17. Although only one printing member is illustrated, it is to be understood that a plurality of styli may be provided for printing various indicia upon the surface of sheet 17.

Thus, in view of the foregoing description, the illustrated embodiment provides a projection device for images on the reflective surface of each or either of two prisms 27 which may be projected to viewing screens 40.

Although score sheet 17 has been described hereinabove as having a transferable backing in the form of carbon, preferably the backing of score sheet 17 is an adhesive material capable of releasably adhering to surface 28 responsive to pressure on the printing surface of the score sheet. An example of such material is the adhesive-like material used in readily available "magic slate" constructions. The wax-like magic slate materials automatically erase any impressions from surface 28 upon their removal, i.e., with removal of score sheet 17, as may other similar materials. Preferably the score sheet 17 used in conjunction with a particular prism includes grids printed thereon registering with those printed on the prism therebeneath, frame 19 providing a register for abutting edges of the score sheet 17.

Alternatively, a manifold of score sheets, the last score sheet in the manifold being backed with pressure transmitting substance, may be used and a plurality of records may thereby be made concurrently with each other and concurrently with the producing of the image for projection to a viewing screen.

While the platen surface of the prism is substantially totally reflecting if the light strikes it at a suitable angle, there may be circumstances under which some stray light passes outwardly or inwardly through the glass-air interface at the platen surface and for this reason it is preferable to utilize a score sheet of material which is substantially non-light transmitting.

I claim:

1. A printing and projecting apparatus, comprising, a light transmitting prism having a light reflecting surface for reflecting light interiorly thereof and for backing exteriorly thereof a sheet of material adapted to have a legend impressed thereon, means for holding the sheet adjacent said prism surface, means for printing a legend upon the surface of the sheet remote from said platen surface and adhering the surface of the sheet adjacent said platen surface to the platen surface, a viewing screen, a light source associated with said prism for directing light through said prism toward said interiorly reflecting surface and reflectng an image of said legend therefrom and optical means for transferring the reflected image to said viewing screen.

2. A projector, comprising, a light transmitting platen having a light reflecting surface for backing a sheet adapted to have a legend impressed thereon, means for holding a sheet with a pressure adhering surface adjacent said platen surface and the surface of the sheet remote from said platen surface accessible for impression of a legened thereon, thereby to adhere impressed areas of the pressure adhering surface to the reflecting surface of the platen, and a light source and optical means associated therewith for directing light through said platen toward said platen surface and reflecting an image of said legend therefrom to a viewing screen.

3. A printing and projecting apparatus, comprising, a light transmitting platen having a light reflecting surface for backing a sheet of material adapted to have a score legend impressed thereon, means for holding the sheet adjacent said platen surface, means for impressing a score legend upon the surface of the sheet remote from said platen surface and adhering the surface of the sheet adjacent said platen surface to the platen surface, and a light source and optical means associated therewith for directing light through said platen toward said platen surface and reflecting an image of said score legend therefrom to a viewing screen.

4. A projector, comprising, a light transmitting prism having a light reflecting platen surface for backing a sheet adapted to have a legened impressed thereon, means for holding a sheet with a pressure adhering surface adjacent said platen surface and the surface of the sheet remote from said platen surface accessible for impression of a legend thereon, thereby to adhere impressed areas of the pressure adhering surface to the platen surface, a viewing screen, and a light source and optical means associated therewith for directing light through said prism toward said platen surface and reflecting an image of said legend therefrom to said viewing screen.

5. A printing and projecting apparatus, comprising, a light transmitting prism having a light reflecting platen surface for backing a sheet of material adapted to have a legend impressed thereon, means for holding the sheet adjacent said platen surface, means for impressing a legend upon the surface of the sheet remote from said platen surface and adhering the surface of the sheet adjacent said platen surface to the platen surface, a viewing screen, and a light source and optical means associated therewith for directing light through said prism toward said platen surface and reflecting an image of said legend therefrom to said viewing screen.

6. A printing and projecting apparatus, comprising, a light transmitting prism having a surface capable of reflecting light interiorly of said surface, a sheet of material adapted to have a legend impressed upon one surface thereof from the reverse surface thereof, means for holding the sheet against said light reflecting prism surface, with said reverse surface accessible for printing thereon, means for printing a legend upon the reverse surface of the sheet, a viewing screen, a light source associated with said prism for directing light angularly through said prism toward said interiorly reflecting surface and reflecting an image of said legend therefrom, and optical means for directing the light and reflected image through a path to said viewing screen.

7. A viewing device comprising, a prism having a platen surface, a sheet of material having a printable surface, said sheet having a reverse surface adapted to print a legend upon said platen surface responsive to pressure on said printable surface with said reverse surface overlying said platen surface, means for holding said sheet with said reverse surface adjacent said platen surface, and a light source associated therewith for directing light through said prism toward said platen surface and reflecting an image of said legend therefrom.

8. A device for projecting an image in a light beam from a surface carrying the image, which device comprises a prism having a surface capable of reflecting light interiorly of said prism, a reflective printable member adapted to overlie said reflecting surface and adhesive comparatively non-reflective reverse image indicia on the surface of said printable member facing said reflective surface releasably adhering to said reflective surface in an area defining said image whereby said adhering reverse image indicia substantially decreases the interior reflectivity of said area of said surface relative to the remainder of said surface.

9. Projecting or viewing apparatus which comprises a prism capable of transmitting light from one surface interiorly thereof to an interiorly reflective platen surface thereof and a nontransparent sheet of printable material having a printable surface overlying said platen surface, and having a reverse surface adapted to removably transfer pressure printed indicia from the printable surface thereof to said platen surface by selective adherence of said reverse surface thereto by printing pressure applied to said printable surface through said sheet to said reverse surface and to the platen surface, whereby with said reverse surface overlying said reflective surface pressure printing of indicia on said printable surface form a removable adhering impression thereof on said reflective surface which impression may be projected through said prism and a suitable optical system to a viewing screen while said reverse surface continues to overlie said reflective surface, said sheet having sufficient opacity to conceal printing operations on the printable side of the sheet from view through said prism so that the projected image does not include a projected image of operating printing means, the projected image reflecting solely the results of impressions on said printable side by the printing means, the results appearing in the projected image at the time effected by transfer of pressure printed indicia from said reverse surface onto said reflective surface.

10. A method of printing and projecting an image to a screen while producing a relatively permanent record thereof which comprises placing on a platen surface of a light transmitting prism a sheet of opaque material having a printable surface and an opposing surface, said opposing surface being adapted to releasably adhere to said supporting platen surface responsive to printing pressure on said printable surface with the supporting platen surface backing said sheet of material and disposed face-to-face with said opposing surface of said sheet, printing indicia on said printable surface to provide a permanent printed record, whereby said opposing surface adheres to said platen surface under printing pressure in the form of the printed indicia, directing a beam of light through said prism to reflect interiorly from said platen surface and thence exteriorly from said prism from another surface thereof, directing and focusing said reflected light to a viewing screen to provide an image of said indicia thereon, repeating said printing step while maintaining the resulting projection on the screen, in the absence of an image of the printing means on said screen, and thereafter concurrently removing said sheet and said image from said platen surface when desired, the resulting projection of the image on the screen thereupon ceasing.

11. A method of printing and projecting an image to a screen without interruption of the projected image and without projection of a direct image of any portion of the printing means during printing which comprises placing a sheet of nontransparent pressure transfer printing material on a surface of a light transmitting platen sufficient to mask substantial light transmission from beyond said sheet through said platen surface, directing light through said platen to reflect interiorly from said platen surface to a viewing screen to provide thereon a focused projection of any image which may be present on said platen surface, and applying pressure stylus means to the accessible surface of said transfer printing material while continuing the directing of said light through said platen and to said screen, whereby an image is produced by said printing material on said platen surface responsive to said pressure stylus means and whereby a projected image of the printed image is concurrently produced on said screen.

12. A method of projecting an image to a screen while producing a relatively permanent record thereof which comprises placing on a surface of a light transmitting platen a sheet of printable material having a backing surface adapted to transfer printed indicia to a supporting platen surface responsive to pressure printing with pressure stylus means on said printable material, directing light through said platen to reflect interiorly from said platen surface and thence exteriorly from said platen to a viewing screen to provide a projection of said reflective surface thereon, and printing indicia on said printable material with said stylus means to provide a permanent printed record thereof whereby the printed record is transferred to said platen surface to form an image source in the form of the pressure printed indicia while maintaining the projection, including the resulting projection of this image in the form of said indicia on the screen.

13. In a projecting apparatus, in combination, a prism having a first surface adapted for transmitting light from outside the prism to the interior of the prism, a second surface for normally reflecting light transmitted thereto through said first surface and a third surface for transmitting light reflected from said second surface exteriorly of the prism, means for supporting the prism, a sheet of material disposed adjacent to said second surface of said prism and having a pressure adhering surface thereon facing said second surface, means for holding the sheet juxtaposed with said second surface and with the reverse surface of the sheet exposed for impression of indicia thereon, so that upon the impression of indicia on said reverse surface selective portions of said adhering surface corresponding to said indicia adhere to said second surface thereby destroying the normally reflective properties of corresponding portions of said second surface to produce an image of the indicia in light reflected from said second surface interiorly of the prism, without reflecting an image of that which impresses the indicia, means for directing light into the prism through said first surface and to said second surface, and optical means for transmitting the image reflected from said second surface through said third surface to a viewing surface.

14. A method of printing a legend and projecting an image of the legend to a viewing screen comprising, the steps of, placing on a light transmitting platen a sheet having a first surface accessible for impression of a legend thereon and an opposed surface to which the legend is transferred when impressed on the first surface, continuously holding the sheet stationary on the platen, intermittently progressively impressing a legend on the first surface of the sheet and thereby simultaneously transferring such legend to said opposed surface of the sheet, directing light continuously through said platen toward said opposed surface of the sheet to reflect an image of the opposed surface of the legend through the platen, and continuously projecting the reflected image to a viewing screen so that the intermittently changing image is continuously projected to the viewing screen without transmitting an image of the means which impresses the legend on the sheet.

15. An apparatus for projecting an image of a legend to a viewing screen, comprising, a light transmitting platen for supporting a sheet having a first surface accessible for intermittent progressive impression of a legend thereon and an opposed surface to which the legend is transferred when impressed on the first surface, means for holding such sheet stationary on the platen, means for continuously directing light through said platen toward said opposed surface of the sheet to reflect an image of the opposed surface of the legend through the platen, and means for continuously projecting the reflected image to a viewing screen so that the intermittently changing image is continuously projected without transmitting an image of the means which impresses the legend on the sheet.

16. A projection apparatus, comprising, a legend receiving sheet of material having first surface means for receiving application of an informational legend and second opposite surface means for bearing the legend responsive to application thereof on said first surface, a light transmitting platen having a surface for backing said sheet of material, means for holding the sheet adjacent said platen surface with said second surface of the sheet facing said platen, said holding means being of a shape and extent exposing a substantial portion of the first surface of the sheet remote from said platen surface for application of a legend thereon, and a light source and optical means associated therewith for directing light into said platen through a surface thereof other than said sheet backing surface, and through said platen toward said sheet, and transmitting an image of said legend reflected through said platen to a viewing screen.

17. An apparatus as defined in claim 16, including means adjacent said first mentioned platen surface for applying a legend to said first surface of said sheet.

References Cited by the Examiner

UNITED STATES PATENTS

| 2,685,227 | 8/1954 | Brietzke. | |
| 2,823,582 | 2/1958 | Gray | 88—24 |
| 3,138,059 | 6/1964 | White | 88—24 |
| 3,174,414 | 3/1965 | Myer | 88—24 |

FOREIGN PATENTS

| 614,870 | 12/1926 | France. |
| 1,279,317 | 11/1961 | France. |

JOHN M. HORAN, *Primary Examiner.*

NORTON ANSHER, *Examiner.*

H. H. FLANDERS, *Assistant Examiner.*